Feb. 25, 1964 A. F. BLEIWEISS ETAL 3,122,620
VOLTAGE AND TEMPERATURE COMPENSATED VANE FLASHER
Filed June 20, 1961 3 Sheets-Sheet 1

INVENTORS
Arthur F. Bleiweiss
George W. Colombo
BY John B. Dickson
Boris Orlov
Blum, Moscovitz, Friedman
and Blum
ATTORNEYS INVENTORS
Arthur F. Bleiweiss
George W. Colombo
John B. Dickson
Boris Orlov

BY

ATTORNEYS

Feb. 25, 1964     A. F. BLEIWEISS ETAL     3,122,620
VOLTAGE AND TEMPERATURE COMPENSATED VANE FLASHER
Filed June 20, 1961     3 Sheets-Sheet 3

INVENTORS
Arthur F. Bleiweiss
George W. Colombo
John B. Dickson
Boris Orlov
BY
ATTORNEYS 3,122,620
VOLTAGE AND TEMPERATURE COMPENSATED
VANE FLASHER
Arthur F. Bleiweiss, Great Neck, George W. Colombo, East Rockaway, John B. Dickson, Kew Gardens, and Boris Orlov, Richmond Hill, N.Y., assignors to Signal-Stat Corporation, Brooklyn, N.Y., a corporation of New York
Filed June 20, 1961, Ser. No. 118,455
16 Claims. (Cl. 200—122)

This invention relates to thermomotive flashers or circuit breakers and, more particularly, to such a flasher or circuit breaker incorporating novel voltage and ambient temperature compensating means effective to modulate continuously the circuit constants of the flasher or circuit breaker in accordance with changes in operating voltage or ambient temperature or both.

Flashers and automatic circuit breakers are commonly used in automotive vehicles for flashing signalling lamps, such as turn signal lamps, flare lamps, and the like. The flashers so used in automotive applications generally are thermomotive flashers of either the series, or current-operated, type, or the shunt, or voltage-operated, type. While thermomotive actuated automotive vehicle flashers are simpler and much less expensive than other types of flashers, such as, for example, motor driven commutators, they have the disadvantages of being very sensitive to changes in operating voltage and ambient temperature, these changes affecting the cycling rates of the flashers, and sometimes the on-off time ratios thereof.

As will be appreciated by those skilled in the art, voltage fluctuations are characteristic of the electrical systems of automotive vehicles, which generally comprise a battery and a generator connected in parallel with the voltage varying within limits even though voltage regulation is employed with the generator. For example, a nominal twelve-volt automotive vehicles electrical system may vary from eleven volts to about fifteen volts. This is a substantial percentage variation in the nominal voltage supply, and results in a correspondingly very substantial change in the operating characteristics of thermomotive flashers.

Part of the reason for the variation in performance of thermomotive flashers with variations in ambient temperature and operating voltage is the fact that the operating element of a thermomotive flasher is an electrically conductive element having an electrical resistance such that the load current is capable of elevating its temperature by a substantial amount. As a result of such elevation in its temperature, the element will expand in accordance with its temperature coefficient of expansion.

In the case of the aforementioned voltage or shunt type flasher, the operating element is connected in parallel with the load circuit controlling contacts of the flasher, and the latter are normally open. Thus, when the circuit is energized, the load current will flow entirely through the operating element and the resistance drop across the operating element is such that there is an insufficient voltage drop across the usual incandescent signal lamps to effectively illuminate the latter. As the operating element is heated to a point where it has expended by a predetermined amount, the contacts are snapped closed, effectively shorting the operating element and allowing substantially the full applied voltage to be effective upon the signal lamps which thereupon become effectively illuminated. During this period, the shorted operating element cools and contracts and, after a predetermined contraction, snaps open the flasher load carrying contacts, and the cycle repeats.

In the aforementioned series type flasher, the operating element is connected in series with the flasher load carrying contacts, and these contacts are normally closed. When the signalling circuit is energized, the load current flows across the contacts and through the operating element and the signal lamps. In this case, the overall resistance of the operating element is made very substantially less than the operating element of a shunt type flasher, so that the effective voltage drop across the signal lamps is sufficient to effectively illuminate the latter. As the operating element heats and expands, it eventually snaps open the load circuit contacts so that the circuit is open and the signal lamps become extinguished. The operating element thereupon cools and contracts and, after a predetermined contraction, recloses the load carrying contacts of the flasher to again complete the circuit.

Thus, the operating element of either a shunt type flasher or a series type flasher is subjected, during its heating, to at least part of the potential applied across the circuit in which the flasher is connected, so that the part of the voltage drop across the operating element will vary with the load voltage. As a result, the rate of expansion of the operating element will also vary with the load voltage. Additionally, the rate of expansion and contraction fo the operating element will also vary with ambient temperature.

The foregoing will be clear when it is considered that, if the ambient temperature remains constant, the heating energy W required to expand the operating element a pre-set amount, and which is a constant with constant ambient temperature, is equal to the product of the voltage drop E across the operating element, current I therethrough and time T, or, expressed as an equation:

$$W = EIT$$

As the factor W remains constant, the time T will vary inversely with any variation in either E or I with the other of these latter two factors remaining constant.

Under standards set by the Society of Automotive Engineers (SAE), the voltage drop across automotive flasher, for example of the series type, is held to 0.4 volt. As the major part of the voltage drop across a flasher occurs in the operating element thereof, it may be safely assumed that the voltage drop across the operating element would be of approximately 0.3 volt, due to the resistance of this element. However, even if the pull ribbon or operating element is not subjected to the full applied voltage, but only to a small fraction thereof, the percentage change in the voltage drop across the pull ribbon will be substantially equal to the percentage change in the applied voltage.

The signal lamps used are incandescent lamps, and the filaments of these lamps have a very high temperature coefficient of resistance. As a result of this, while the resistance of the signal lamps varies substantially with the current flow therethrough, the resistance across the flasher is substantially stable for all practical purposes. However, both the voltage drop across the flasher and the current flow through the flasher vary with the applied voltage and, with W remaining constant, the operating time T will vary inversely with applied voltage. This means that the cycling rate of the flasher increases with the operating voltage, and vice versa.

On the other hand, if the voltage remains constant but the ambient temperature increases, the electrical energy input required to expand the operating element such preset amount will be decreased by the increment of heat input due to the increased ambient temperature. Consequently, the heating time T will be proportionately decreased and the cycling rate will be increased. Stated another way, the required electrical energy input W varies inversely with the ambient temperature, so that, with E and I remaining constant, T decreases and the cycling rate, which is the reciprocal of T, increases.

To obviate or at least to ameliorate the tendency of the operating constants of thermomotive flashers to vary with variations of ambient temperature and variations of applied voltage, the present invention provides that at least one of the factors determining the operating characteristics of thermomotive flashers is continuously modulated in accordance with variations in the voltage drop across the flasher and changes in ambient temperature, such continuous modulation being effected in a novel manner by movable voltage and ambient temperature responsive means effective to continuously modulate the length of the operating element actually connected in circuit and carrying current, to modulate its effective circuit resistance in such manner that the operating characteristics of the flasher are maintained substantially constant irrespective of such changes.

More particularly, the modulating means of the present invention includes thermomotive actuated shorting means having a fixed end electrically connected to an end of the operating element and a free portion movable along the operating element in sliding contact therewith to shunt or short out the operating element in proportion to the heating of the shorting means. The shorting means is provided with an electric heater in shunt or parallel with the load circuit controlling contacts of the flasher and thus subjected to the full circuit potential when these contacts are open. The deflection of the thermomotive actuated shorting means is accordingly proportional to substantially the full circuit potential, so that the degree of shunting of the operating element is also proportional to substantially the full circuit potential.

The parts are so constructed and arranged that, at some pre-selected minimum operating voltage, such as eleven volts, for example, the movable or free portion of the shorting means is positioned substantially at such one end of the operating element so that the entire length of the latter is then in circuit. Furthermore, at some pre-selected maximum voltage such as, for example fifteen volts, a pre-selected maximum length of the operating element is shunted and thus cut out of the circuit. These limits may be accurately pre-set by the use, for example, of stop means for limiting the motion of the free portion of the shorting means.

It will be appreciated that the thermomotive actuated shorting means is also responsive to ambient temperature so that any shorting out of the operating element by the shorting means is a result not only of the circuit voltage but also of the ambient temperature effective on the thermomotive actuation of the shorting means.

The invention is applicable to any type of thermomotive flasher involving an electrical heating responsive expansible operating element which effects opening and closing of the contacts. However, it is more particularly effective when applied to a thermomotive flasher of the type incorporating a snap action vane and pull element, such as shown, for example, in Welsh U.S. Patent 2,756,304, issued July 24, 1956. As applied to this type of thermomotive flasher, the shorting means is utilized to vary the length of the pull element effectively connected in circuit, the pull element constituting the heat expansible operating element for this type of flasher. To provide a specific example of the application of the principles of the invention, the invention will therefore be described as applied to this particular type of thermomotive flasher, although it will be understood that the principles of the invention are not limited thereto but are applicable to any type of thermomotive flasher involving an electrical heat expansible operating element.

In one embodiment of the invention as applied to such snap action vane type flasher, a shorting arm is pivoted to the vane close to one end thereof and extends across the pull ribbon, in sliding contact relation therewith, and beyond the opposite edge of the vane. The pull ribbon has a contact fixedly secured substantially centrally thereof and constituting a movable contact cooperable with a relatively fixed or immovable contact to control the load current flow through the flasher, and the shorting arm is movable over substantially one-half the length of the pull ribbon between one end thereof and the centrally located contact. A thermomotive element, such as a bimetal arm, has one end fixed to the dielectric base of the flasher adjacent such one edge of the vane and extends across the vane and beyond such opposite edges thereof, the free end of the bimetal arm being interconnected with the free end of the shorting arm to move the latter in accordance with changes in the position of the free end of the bimetal arm. The bimetal arm carries a heating winding adjacent its fixed end, and the winding is connected in shunt with the flasher contacts. The shorting arm is thus moved in accordance with changes in the ambient temperature or changes in the heat input to the bimetal arm, by the heating winding, responsive to changes in operating voltage.

In another embodiment of the invention, the bimetal arm itself is used as the shorting arm and moves over substantially one-half of the pull ribbon to effectively short out more or less of the length of the pull ribbon in accordance with ambient temperature and voltage changes.

For an understanding of the principles of the invention, reference is made to the following description of typical embodiments thereof as illustrated in the accompanying drawings. In the drawings.

Figure 10:
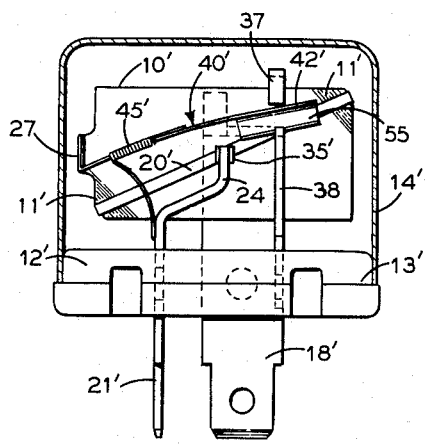
FIG. 10 is a front elevational view, with the casing in section, of another embodiment of the thermomotive flasher embodying the invention.
Figure 11:
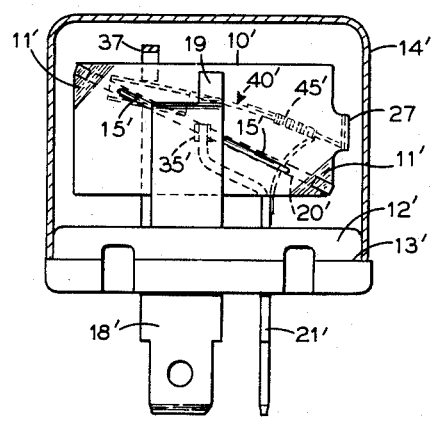
FIG. 11 is a rear elevational view, with the casing in section, of the flasher shown in FIG. 10.
Figure 12:
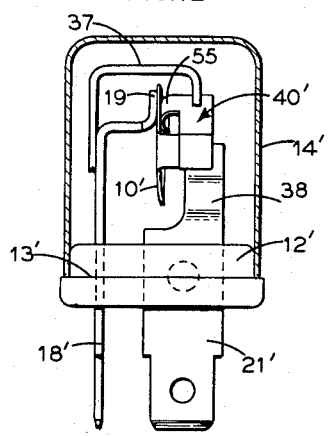
Figure 13:
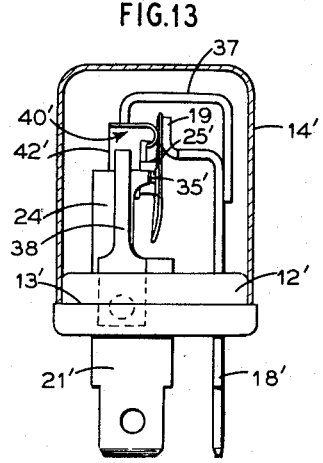
Figure 14:
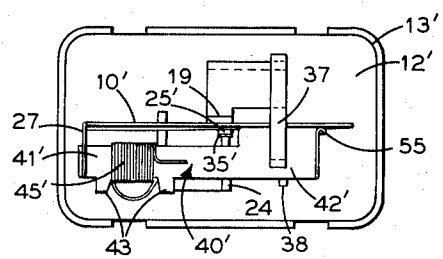

FIGS. 12 and 13 are left and right end elevational views, respectively, with the casing in section, of the flasher shown in FIGS. 10 and 11; and FIG. 14 is a plan view of the flasher shown in FIGS. 10 through 13, with the casing removed.

Referring first to the embodiment of the invention shown in FIGS. 1 through 9, the principal operating components of the flasher are a snap action, preferably electrically conductive, metal vane 10 to which is attached a pull ribbon 20 of electrically conductive thermally expansible metal whose resistance is such that the load current is capable of elevating its temperature by a substantial amount. As set forth in said Welsh patent, vane 10 is formed with linearly extending aligned and spaced pre-set deformations 15 extending diagonally thereacross, providing an initial bending line about which the vane is bent in its "restored" position. At the ends of this diagonal, the corners 11 of the vane are bent out of the general plane of the vane and the opposite ends of pull ribbon 20 are permanently secured thereto as by soldering, brazing, or the like. Pull ribbon 20 is secured to vane 10 in the cold contracted condition of the pull ribbon and while the vane is bent about another bend line extending at an angle to the deformations 15 so that the vane, with the pull ribbon 20 attached thereto, is bent about this other line in a "stress-deformed" condition. The bending of vane 10 to the "stress-deformed" condition stores kinetic energy in the vane so that the latter tends always to snap back to the "restored" condition as soon as the tension, holding it in the "stress-deformed" condition, is released.

As the temperature of the pull ribbon increases due to the flow of electric current therethrough, the pull ribbon expands and, after a predetermined expansion of the pull ribbon, the kinetic energy in the vane 10 overcomes the holding force of the pull ribbon and the vane 10 snaps to its restored position in which it is bent about the deformations 15—15. As the pull ribbon 20 cools and contracts, it snaps the vane 10 back to the "stress-deformed" condition in which it is bent about a line extending at an angle to the line of deformation 15—15.

As further explained in said Welsh patent, when vane 10 is fixedly supported at a zone or point spaced laterally of the bend line 15—15, a movable portion of the vane will have a relatively high amplitude of movement when the vane is alternatively snapped between its "restored" and "stress-deformed" position.

The flasher operating elements are supported upon a dielectric base 12, which, in the form illustrated, is substantially rectangular with rounded corners and has a ledge 13 extending therearound. This ledge 13 serves to seat a metal casing 14 for the flasher parts. A conductive metal plate 30 is supported on the upper surface of the base 12 and is anchored thereto by the rivets 16 and 17. Rivet 16 also anchors a male prong 18 to the base and electrically connects this prong to the plate 30. A first arm 31 is bent upwardly from an edge of plate 30 and then outwardly, the outwardly extending portion of this arm 31 being brazed, riveted, soldered, or otherwise anchored to vane 10 at a point substantially laterally of the line of deformation 15—15. This point of anchoring of vane 10 to arm 31 forms the fixed mounting for the vane about which the major part of the vane pivots during its snapping action. For a purpose to be described, a second arm 32 extends outwardly from one end of the plate 30 and is then bent upwardly. A third arm 33 is bent upwardly from an outer edge of plate 30 and then preferably inwardly parallel to the plate, and a fourth arm 34 extends laterally outwardly from the opposite edge of the plate 30, and preferably in lateral alignment with arm 33, and then extends upwardly. The purpose of arms 32, 33 and 34 will be described hereinafter.

A second prong 21 extends from base 12 and is anchored to the base by means of a post 22 having its bottom end riveted over a bent portion of the prong 21 and its upper end enlarged, as at 23, and disposed a substantial distance above the upper surface of metal plate 30. The post 22 is physically separate and spaced from the plate 30, and is consequently electrically isolated therefrom. The upper surface of the enlarged head 23 is very close to the pull ribbon 20, which carries a centrally positioned contact 25 which cooperates with a fixed contact 35 on the upper end of the head 23.

The contacts 25 and 35 are in engagement when no potential is impressed across the terminals 18 and 21. In the usual manner of using a flasher of this type, the latter is plugged into a suitable receptacle which is connected in series with a signalling circuit. For example, the receptacle may be connected in series with a turn signalling switch and the turn signalling lamps of a vehicle. In such a case, when the turn signal switch is closed in either direction, the current will flow from prong 21 into post 22 and thus through contacts 35 and 25 into pull ribbon 20. The current divides in pull ribbon 20 so that one-half flows through each end of the pull ribbon and thus into the vane 10. From the vane 10, the current flows through the support arm 31 and thus into the metal plate 30 connected electrically to the prong 18.

The current flow through the pull ribbon 20 will heat the latter so that it will expand. After a pre-set expansion of pull ribbon 20, the vane 10 will snap to its "restored" position, pivoting about its connection with the post or arm 31. The portion of the vane to which the pull ribbon 20 is attached will have a substantial amplitude of movement away from the post 22, so that the contacts 25 and 35 will be snapped to open the load circuit. As the current flow through the pull ribbon is thereupon interrupted, the latter will cool and contract. After a predetermined contraction, the pull ribbon will snap the vane from its "restored" condition to its "stress-deformed" condition, effecting snap re-engagement of the contacts 25 and 35. This re-establishes the load circuit through the flasher across the contacts 25 and 35, so that pull ribbon 20 is again heated by current flow therethrough. This cyclic action continues as long as a potential is applied across the prongs 18 and 21.

Except for the provision of the plate 30, and particularly the arms 32, 33 and 34 thereof, the flasher as so far described is conventional and will operate in the conventional manner characteristic of thermomotive flashers and particularly of such flashers as described in said Welsh patent. Thus, the cycling rate of the flasher will vary with changes in the potential drop across the prongs 18 and 21 (nominally 0.4 volt) and also with changes in ambient temperature. For example, if the voltage drop across prongs 18 and 21 decreases, it will take a longer time for the pull ribbon 20 to heat and expand sufficiently to allow the vane 10 to snap open the contacts 25 and 35, and conversely if the voltage drop across prongs 18 and 21 increases. This, in turn, will either increase, in the one case, or decrease, in the other case, the "on" time of the flasher. If the ambient temperature is relatively high, the cooling time of the pull ribbon 20 will be increased, and its heating time will be decreased, thus involving a further change in the cycling rate of the flasher as well as in the "on-off" time ratio. As will now be explained, the flasher embodying the present invention is provided with means for automatically and continuously modulating the effective resistance of pull ribbon 20, or the length thereof effectively in circuit, in accordance with the value of the applied operating potential, so as to maintain the cycling rate and "on-off" time ratio substantially constant irrespective of variations in potential and in ambient temperature.

A thermomotive arm 40, which is preferably a bimetallic arm, has a relatively narrow inner portion 41 fixedly secured at its end to the upright post 32. The outer or free portion 42 of arm 40 is somewhat longer than the narrower inner portion and is formed with a channel shape so as to provide increased rigidity to the outer portion 42. Arm 40 extends substantially completely across the vane 10 so that the outer end thereof is adjacent the far edge of the vane 10. A heating winding 45 is wrapped on the bimetal arm 40 as near as possible to the fixed connection thereof with the post 32, so as to obtain maximum deflection of the outer end of the arm 40 with a given heat input. One end of winding 45 is secured to a heat conductive and preferably flexible strip of metal 26 which has its opposite end in electrical and mechanical contact with the post 22. The other end of heating winding 45 is electrically and mechanically connected to the bimetal arm 40, which is also electrically conductive. Thereby, the heating winding 45 is effectively connected in shunt with the load contacts 25 and 35, as will be particularly apparent from the schematic wiring diagram shown in FIG. 9.

Figure 1:
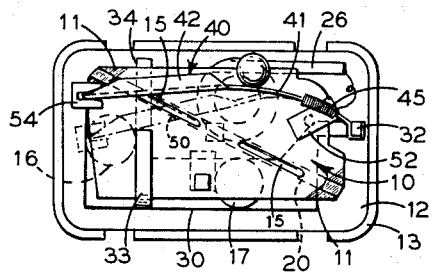
FIG. 1 is a plan view of one embodiment of the flasher with the casing removed.
Figure 2:
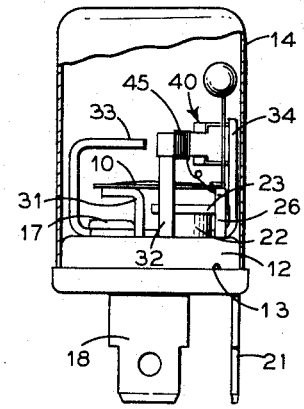
FIG. 2 is a right end elevational view of the flasher shown in FIG. 1, the casing being partly broken away.
Figure 3:
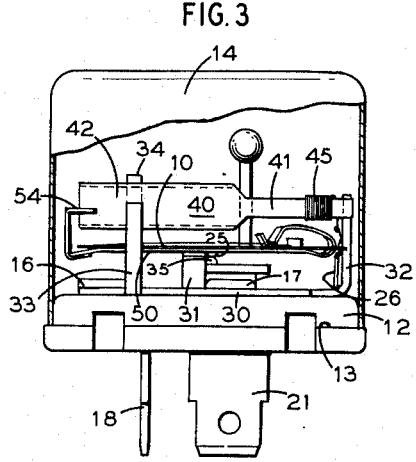
FIG. 3 is a front elevational view of the flasher shown in FIG. 1, the casing being partly broken away.
Figure 4:
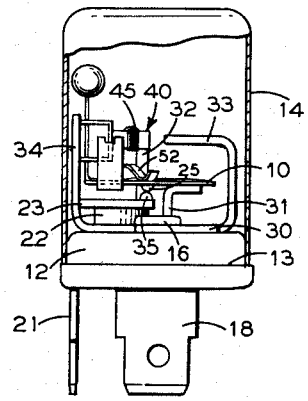
FIG. 4 is a left end elevational view of the flasher shown in FIG. 1, with the casing partly broken away.
Figure 5:
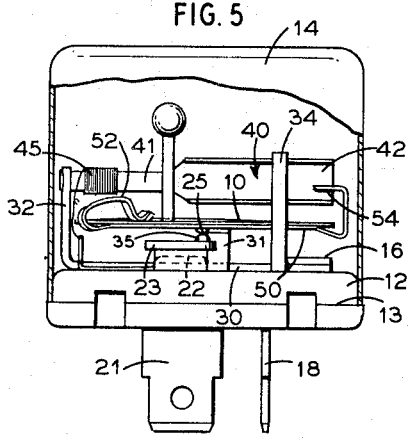
FIG. 5 is a rear elevational view of the flasher shown in FIG. 1 with the casing being partly broken away.
Figure 6:
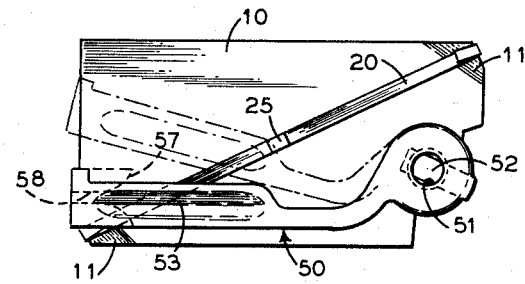
FIG. 6 is a bottom plan view of the flasher and pull ribbon illustrating the shorting arm pivoted to the vane.
Figure 7:
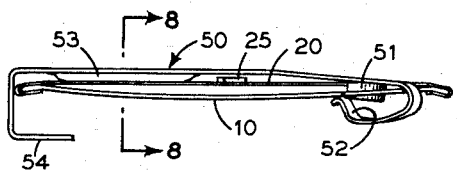
FIG. 7 is a front elevational view corresponding to FIG. 6.
Figure 8:
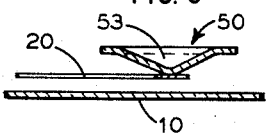
FIG. 8 is a sectional view taken on the line 8—8 of FIG. 7.

As best seen in FIGS. 6 through 8, a shorting arm 50 is pivotally, electrically, and mechanically connected to the vane 10 so as to extend across the pull ribbon in sliding engagement therewith. Arm 50 is of electrically conductive metal and, at its pivot point, has a cylindrical projection 51 deformed to extend through a circular aperture in the vane 10. Beyond the pivot projection 51, the arm 50 has a portion 52 bent over to form a spring finger bearing against the surface of vane 10 opposite to that having the pull ribbon 20 extending thereacross. Thereby, the arm 50 may be readily and easily connected to the vane 10 by merely sliding the bent over end portion thereof across the vane until the pivot 51 engages in the hole in the vane, with the spring arm 52 maintaining such engagement.

Arm 50 is somewhat angular in plan so that, for the major part of its length, it is off-set laterally from a radius through the pivot 51, as best seen in FIG. 6. The outer half of the arm 50 is deformed and widened to provide a relatively wide V portion 53 extending longitudinally thereof as best seen in FIGS. 6, 7, and 8. The V 53 provides a line contact with the pull ribbon 20. The extreme free end of the arm 50 is bent rectangularly upwardly and then inwardly over the vane 10 as indicated at 54 in FIGS. 1, 3, and 5 through 7. The inwardly bent portion 54 is formed with a V notch 57 opening into a slot 58. This slot receives the free end of the channel portion 42 of the bimetal arm 40, the "base" of this channel portion extending into the V notch 57 and the slot 58. Thereby, motion of the bimetal arm 40 is communicated to the shorting arm 50.

The posts 33 and 34 act as limit stops for the movement of the thermomotive arm 40, the post 34 limiting the movement of arm 40 to a position wherein the shorting arm 50 is at the end of the pull ribbon 20, and the arm 33 limiting the movement of the thermomotive arm 40 to a position wherein the shorting arm 50 is in contact with the pull ribbon immediately adjacent the movable contact 25 at the center thereof. The parameters of the construction and assembly of the flasher are so selected that the thermomotive arm 40 is initially bent and stressed in engagement with the post 34, and the parameters of the heating winding 45 are so selected that, at a selected minimum value of the range of operating voltage, for example eleven volts, the heating effect on the arm 40 is such that the arm is just ready to bend away from the post 34. Thus, if the voltage increases above this lower limit, for example to twelve volts, the arm 40 will deflect further inwardly and thereby move the shorting arm 50 inwardly along the pull ribbon 20. The stop 33 is so positioned that it will be engaged by the arm 40 when the operating voltage attains a selected maximum value of its range, such as fifteen volts, thereby preventing damage to the arm 40 due to excessive over-voltage, for example.

Figure 9:
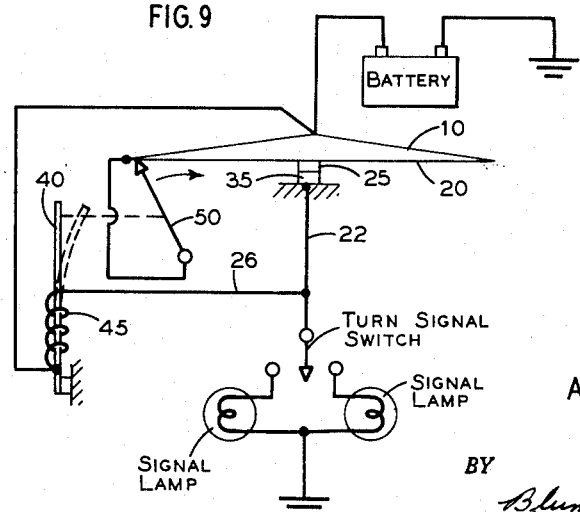
FIG. 9 is a schematic wiring diagram illustrating the operation of the flasher shown in FIGS. 1 through 8.

It will be noted, particularly from FIG. 9, that the heating winding 45 is connected across the contacts 25, 35 and is therefore shorted out whenever these contacts are closed. Consequently, when the flasher contacts are closed so that current will flow through the signal lamps, there is no current flow, or substantially no current flow, through the heating winding 45. However, when the contacts 25, 35 are snapped apart to open the flasher circuit, as explained above, substantially the full open circuit potential is impressed across the heating winding 45. Thus, the winding 45 conducts current at substantially the full applied potential each time the flasher contacts are snapped open, and thus the average current flow through the winding 45 is a function of the applied potential. Consequently, the heating effect of the winding 45 on the arm 40 will be proportional to the applied potential. The deflection of arm 40 is proportional to the heat applied thereto by the heating winding 45, so that this deflection will be proportional, in turn, to substantially the full available voltage. The proportionate movement of the arms 40 and 50 due to heating of the arm 40 by the winding 45, and response to changes in the applied voltage, is selected in accordance with the desired cycling rate and "on-off" time of the flasher, this selection being made in such a manner that the ratio of the change in effective resistance of the pull ribbon 20, as a result of shorting out thereof by the arm 50, to the change in voltage is such that the cycling rate is maintained substantially constant within the limits of movement of the arm 40 and the shorting arm 50.

With reference to the factors and the equations discussed at the beginning of this description, the total electric power input or work W, required to expand the pull strip 20 an amount sufficient to provide for snapping of the vane 10 to its "restored" position to snap open the contacts 25 and 35, may be expressed as follows:

$$W = I^2 R T$$

wherein I is the current flow through the pull ribbon 20, R is the effective resistance of the pull ribbon neglecting its temperature coefficient of resistance, and T is the time required for the pull ribbon to expand sufficiently for the vane 10 to snap to its restored position.

From Ohm's law, the current I through the pull ribbon may be expressed as follows:

$$I = \frac{E}{R}$$

wherein E is the voltage drop across the pull ribbon. Thus, the total energy input required to expand the pull ribbon 20 an amount to permit snapping of the vane 10 also may be expressed as follows:

$$W = \frac{E^2}{R} T$$

From this equation, it may be seen that, for the time T, which determines the cycling rate, to remain constant, the factor $$\left(\frac{E^2}{R}\right)$$

must remain constant K so that, for a constant cycling time, the following must hold true:

$$W = KT$$

In order for the constant K to remain at a fixed value, the effective resistance R of the pull strip 20 must be varied inversely as the square of the voltage.

In the invention, the parameters are so designed that the effective resistance of the pull ribbon 20, within the pre-set limits is varied inversely as the square of the voltage so that the cycling time is maintained constant. This attainment is facilitated by the thermomotive arm 40, whose deflection will also vary directly as the square of the voltage and inversely as its resistance, as the heating winding 45 is subjected to the substantially full applied potential, and its heating is proportional to the square thereof.

It will further be appreciated that the arm 40 is subject to deflection due to changes in ambient temperature, and therefore the effective resistance of the pull ribbon 20 is varied in accordance with the ambient temperature, through the medium of the shunting or shorting arm 50, as well as in response to variations in voltage.

The result is a continuous modulating control of the action of the flasher so that the cycling rate and the "on-off" times of the flasher are maintained at a substantially constant value. The arms 33 and 34 may, of course, be bent to obtain slight adjustment of their relative positions and thus of the amplitude of movement of the bimetal arm 40 and the shorting arm 50 connected therewith.

In the embodiment of the invention shown in FIGS. 10 through 14, the compensating action is exactly the same as that in the flasher shown in FIGS. 1 through 8 but, in this second embodiment of the invention, the shorting arm 50, of FIGS. 1 through 8, is omitted and the functions of this shorting arm are effected by the thermomotive or bimetal arm, thus simplifying the construction and rendering it less expensive. There are certain other relatively minor differences in the flasher shown in FIGS. 10 through 14 and these will be mentioned hereinafter. In FIGS. 10 through 14, parts which are the same, or which have exactly the same function, as in the flasher shown in FIGS. 1 through 9, have been given the same reference characters primed.

A noticeable difference in the arrangement shown in FIGS. 10 through 14 as compared with that shown in FIGS. 1 through 8 is that the connecting prongs 18' and 21' are molded into the base 12 to extend therethrough and project from both surfaces of the base, those portions of the prongs 18' and 21' extending upwardly or inwardly of the base serving as the supports for various components of the flasher. The second noticeable difference is that the vane 10' is oriented generally vertically rather than being oriented generally horizontally as in the embodiment shown in FIGS. 1 through 8.

Although differing slightly in planar contour, the vane 10' is exactly the same as the vane 10, being formed with the aforementioned linear pre-set deformations 15', 15' and having the pull strip 20' secured to extend diagonally thereof and normally holding the vane bent into the "stress-deformed" position from which, upon expansion of the pull member 20', the vane 10' snaps back to the "restored" position in which it is bent about the line of the linear deformations 15'.

The upper end of prong 18' is bent inwardly and then upwardly to form a supporting portion 19 which is brazed, soldered, or the like to the vane 10' to support the same laterally of the line of the deformations 15', 15' so that the major portion of the vane 10' may pivot relative to support 19. The inner end of the prong 21' is bent slopingly inwardly and then vertically to form a portion 24 carrying the fixed contact 35' cooperating with the movable contact 25' carried by the pull ribbon 20'.

Vane 10' has a tab 27 bent outwardly centrally from one shorter edge and serving as the anchor or fixed support for the inner end of the thermomotive or bimetal arm 40'. The bimetal arm 40' differs in appearance from the bimetal arm 40, having a relatively wider fixed portion 41' which has a pair of longitudinally spaced tabs projecting from one edge and serving to center the winding 45'. The outer or free portion 42' of the thermomotive member 40' is wider than the inner portion, as best seen in FIG. 14, and has its rectilinear edge nearest the vane curved upwardly, as at 55, to provide a line contact with the pull ribbon 20'. The stops for limiting the movement of the bimetallic or thermomotive arm 40' are, in this embodiment of the invention, constituted by an angular arm 37 having one leg spot welded or the like to the prong 18' and then extending over the vane and inwardly toward the thermomotive arm 40', and an upstanding arm or plate 38 molded into the base 12' and extending upwardly toward the arm 40'.

The heating winding 45' has one end connected to the prong 21' and the other end connected to the bimetallic or thermomotive arm 40', and is thus shorted out when the contacts 25' and 35', carrying the flasher load, are closed, and subjected to substantially the full operating potential when these contacts are open. The arrangement operates in exactly the same manner as does the embodiment of the invention first described, the only difference in operation being that the thermomotive or bimetallic arm 40' performs the functions of both the arm 40 and the arm 50 of the first-described modification.

It has been found, in practice, that the flashers of the invention maintain the cycling rate of the flasher and the "on" and "off" times within very small limits irrespective of wide fluctuations in input voltage and of wide variations in ambient temperature. Due to the location of the heating windings 45 or 45' as close as possible to the fixed ends of the respective bimetallic arms 40 and 40', a maximum deflection of the free ends of these bimetal arms is attained.

While specific embodiments of the invention have been described in detail to illustrate the application of the principles of the invention, it will be understood that the invention may be embodied otherwise without departing from such principles.

What is claimed is:

1. A thermomotive circuit breaker comprising, in combination, a snap action element normally constrained to assume a pre-set restored position; a relatively elongated heat expansible electric resistance element operatively associated with said snap action element and, in its cold and contracted state, constraining said snap action element snapped to a stress-deformed position, said snap action element snapping to its restored position upon pre-set expansion of said resistance element; a pair of load circuit controlling contacts operatively associated with said snap action element and in electric circuit connection with said resistance element, said contacts being closed in one position of said snap action element and open in the other position of said snap action element, and controlling the flow of heating current through said resistance element; thermomotive actuated shorting means having a fixed end electrically connected to an end of said resistance element and having a free portion movable along said resistance element in sliding contact therewith to short out said resistance element in proportion to heating of said shorting means; and an electric heater for said shorting means in shunt with said contacts and subjected to any potential drop across said contacts.

2. A thermomotive circuit breaker as claimed in claim 1, in which said contacts are in series circuit relation with said resistance element.

3. A thermomotive circuit breaker as claimed in claim 1, in which said electric heater comprises a high resistance insulated electric conductor wound on said thermomotive means.

4. A thermomotive circuit breaker as claimed in claim 1, in which said end of said resistance element is electrically and mechanically connected to said snap action element, and said resistance element is movable with said snap action element during snapping of the latter; said contacts comprising a first contact movable with said resistance element and a second relatively fixed contact.

5. A thermomotive circuit breaker as claimed in claim 4, in which said contacts are in series with said resistance element and said snap action element.

6. A thermomotive circuit breaker comprising, in combination, a snap action vane of electrically conductive metal normally constrained to assume a pre-set restored bent position; a relatively elongated heat expansible electric resistance pull element secured at opposite ends to said vane in the cold and contracted state to constrain said vane to be bent to a stress-deformed position, said vane snapping to its restored position upon pre-set expansion of said pull element; means fixedly mounting said vane at a point spaced laterally from said pull element, for movement of the portion of the vane carrying said pull element during snapping of the vane; a pair of load circuit controlling contacts in electric circuit connection with said pull element, and including a relatively fixed contact and a contact carried by one of said elements and movable therewith; said contacts being closed in one position of said vane, for flow of heating current through said pull element, and open in the other position of said vane; thermomotive actuated shorting means having a fixed end electrically connected to an end of said pull element and having a free portion movable along said pull element in sliding contact therewith to short out said pull element in proportion to heating of said shorting means; and an electric heater for said shorting means in shunt with said contacts and subjected to any potential drop across said contacts.

7. A thermomotive circuit breaker as claimed in claim 6, in which said movable contact is carried by said pull element; the circuit breaker operating potential being applied to said vane and to said fixed contact.

8. A thermomotive circuit breaker as claimed in claim 7, in which said movable contact is disposed substantially centrally of said pull element and said free portion of said shorting means is movable over said pull element between such one end thereof and said movable contact.

9. A thermomotive circuit breaker as claimed in claim 6, in which said electric heater comprises a high resistance insulated conductor wound on said thermomotive actuated shorting means and having one end electrically connected to said fixed contact and the other end electrically connected to said vane.

10. A thermomotive circuit breaker as claimed in claim 6, in which the fixed end of said thermomotive actuated shorting means is electrically connected to said resistance element through said vane.

11. A thermomotive circuit breaker as claimed in claim 10, in which said thermomotive actuated shorting means includes a relatively elongated thermomotive member extending across the surface of said vane opposite that having the pull element extending thereacross, from its fixed mounting end, so that its free end is adjacent the far edge of said vane; and a relatively elongated electrically conductive shorting arm pivoted to said vane and having an end extending beyond said far edge of said vane and interconnected with the free end of said thermomotive member, said shorting arm extending over the surface of said vane to which said pull element is connected and contiguously across said pull element.

12. A thermomotive circuit breaker as claimed in claim 11, in which said shorting arm has a pivot extending therefrom and through an opening in said vane, and a reentrant spring arm extending from the pivot end of said shorting arm and overlying and resiliently engaging the opposite surface of said vane to retain said shorting arm assembled with said vane.

13. A thermomotive circuit breaker as claimed in claim 11, in which said shorting arm includes a free portion formed to have line contact with said pull element.

14. A thermomotive circuit breaker as claimed in claim 10, in which said thermomotive actuated shorting means comprises a relatively elongated thermomotive member having a fixed end fixedly mounted on said vane at one edge thereof and extending across and in sliding engagement with said pull element.

15. A thermomotive circuit breaker as claimed in claim 11, including stop means engageable with said thermomotive member to limit the movement thereof in each direction.

16. A thermomotive circuit breaker as claimed in claim 14, including stop means engageable with said thermomotive member to limit the movement thereof in each direction.

References Cited in the file of this patent

UNITED STATES PATENTS

| | | |
|---|---|---|
| 1,289,617 | Berry | Dec. 31, 1918 |
| 1,997,559 | Hajek | July 7, 1934 |
| 2,708,697 | Welsh | May 17, 1955 |
| 2,712,044 | Welsh | June 28, 1955 |
| 2,737,553 | Welsh | Mar. 6, 1956 |